Patented Aug. 30, 1927.

1,640,803

UNITED STATES PATENT OFFICE.

GUSTAV PETZOLD AND HEINRICH RITTNER, OF OFFENBACH-ON-THE-MAIN, GERMANY, ASSIGNORS TO I. G. FARBENINDUSTRIE AKTIENGESELLSCHAFT, OF FRANKFORT, GERMANY.

PROCESS OF PRODUCING COMBINED SHADES OF AZODYESTUFFS AND VAT DYESTUFFS ON THE VEGETABLE FIBER AND IN MATERIALS DYED OR PRINTED ACCORDING TO SUCH PROCESS.

No Drawing. Original application filed December 15, 1924, Serial No. 756,049, and in Germany February 1, 1924. Divided and this application filed June 24, 1925. Serial No. 39,377.

Our invention relates to a process of producing combined shades of azodyestuffs and vat dyestuffs on the vegetable fiber consisting in impregnating the fiber with an alkaline solution of an azo-component, developing with a diazo-solution, an ester-salt of the leuco-compound of a vat dyestuff being added to one of the said solutions and in treating the fiber with oxidizing agents in an acid medium. Our invention also relates to the product of such process.

Ester-salts of the leuco-compounds of vat dyestuffs, which are prepared by transforming leuco-compounds of vat dyestuffs into acid esters of a polybasic acid, are described in the U. S. A. Letters Patent No. 1,448,251 of Marcel Bader and Charles Sunder, dated Mar. 13, 1923. Our present application is a division of our application Serial No. 756,049 filed in the United States Patent Office on December 15, 1924.

Our invention may be used for dyeing as well as for printing, yielding excellently fast combined colors of different shades, which are not known hitherto, and making it possible to supply the consumer in the most concentrated form with products immediately ready for use by simple operations.

In order to illustrate the new process more fully the following examples are given.

EXAMPLE 1.

The unprepared goods are printed with the following printing color:

10 gr. of 4-oxynaphthalene-1-phenyl-ketone are mixed with
30 cc. of caustic soda solution of 34° Bé.,
30 gr. of Turkey red oil and
200 gr. of water, poured in
500 gr. of neutral tragacanth thickening and
10 gr. of the product, prepared from indigo according to the U. S. A. Letters Patent No. 1,448,251, dissolved in
220 gr. of water, are added and the whole is made up to 1000 gr.

Then the goods are printed with a second printing-color:

10 gr. of 5-chloro-2-toluidin are dissolved with
15 gr. of hydrochloric acid of 22° Bé. and
100 gr. of boiling water,
160 gr. of ice and after cooling down
25 cc. of sodium nitrite 1:4 are added; the diazotation being complete, the mass is poured in
500 gr. of neutral tragacanth thickening,
25 gr. of sodium acetate and
165 gr. of water are added and the whole is made up to 1000 gr.

The goods are dried and passed in a lukewarm to boiling bath containing for example 25 to 30 gr. of sodium bisulfate, 30 to 40 cc. of a solution of nitrate of iron of 20° Bé. in the liter, rinsed, soaped and dried.

A chocolate-brown is obtained.

EXAMPLE 2.

The unprepared goods are printed with:

10 gr. of benzoyl - 2.3 - aminonaphthol are mixed with
30 cc. of caustic soda solution of 34° Bé.,
30 gr. of Turkey red oil and
200 gr. of water, poured in
500 gr. of neutral tragacanth thickening and
10 gr. of the product, prepared from indigo according to the U. S. A. Letters Patent No. 1,448,251, dissolved in
220 gr. of water, are added and the whole is made up to 1000 gr.

The goods are dried and printed once more with:

10 gr. of 4-nitro-1.2-anisidin are dissolved with
15 gr. of hydrochloric acid of 22° Bé. and
100 gr. of boiling water,
160 gr. of ice and after cooling down
25 cc. of sodium nitrite 1:4 are added; the diazotation being complete, the mass is poured in
500 gr. of neutral tragacanth thickening,
25 gr. of sodium acetate and
165 gr. of water are added and the whole is made up to 1000 gr.

The goods are dried and passed in a developing-bath of a similar composition as above described, or containing other likewise acting oxidizing agents, rinsed, soaped and dried.

A dark reddish brown is obtained.

EXAMPLE 3.

The goods are prepared with a solution of 12 gr. of 2.5-dichlorophenyl-3-methyl-5-pyrazolon in 15 cc. of caustic soda solution of 34° Bé. by addition of 10 gr. of Turkey red oil and 8 gr. of the product, prepared from indigo according to the U. S. A. Letters Patent No. 1,448,251, in the liter.

The goods are dried and printed with:

16,5 gr. of 2.5-dichloroanilin are dissolved with
100 gr. of hot water and
50 cc. of hydrochloric acid of 20° Bé.
200 gr. of ice and after cooling down
8 gr. of sodium nitrite of a standard of 95%, dissolved in
30 gr. of water, are added; the diazotation being complete the mass is poured in
500 gr. of neutral tragacanth thickening,
45 gr. of sodium acetate and
59 gr. of water are added and the whole is made up to 1000 gr.

The goods are dried and passed in the mentioned developing-bath, rinsed, soaped, rinsed and dried.

A green upon a blue ground is obtained.

EXAMPLE 4.

The goods are prepared with a solution of 10 gr. of aceto-ectyl-anilin in 15 gr. of caustic soda solution of 34° Bé. by adding 10 gr. of Turkey red oil in the liter.

The goods are dried and printed with:

10 gr. of 5-nitro-1.2-toluidin are mixed with
25 gr. of hot water and
5 gr. of sodium nitrite, poured in
350 gr. of water and
30 cc. of hydrochloric acid of 20° Bé.; the diazotation being complete the mass is stirred in
450 gr. of neutral tragacanth thickening,
70 gr. of sodium acetate 1:1 and
10 gr. of the product, prepared from indigo according to the U. S. A. Letters Patent No. 1,448,251, dissolved in
50 gr. of water, are added and the whole is made up to 1000 gr.

The goods are dried and passed in the mentioned developing-bath, rinsed, soaped, rinsed and dried.

A yellowish green is obtained.

By using 10 gr. of the product, prepared from dibromindigo according to the U. S. A. Letters Patent No. 1,448,251, instead of the mentioned indigo derivative, a little more yellowish shades of a greater clearness are obtained.

EXAMPLE 5.

The goods are impregnated with a solution of 10 gr. of aceto-acetyl-para-anisidin in 15 cc. of caustic soda solution of 34° Bé. by adding 10 gr. of Turkey red oil in the liter.

The goods are dried and printed with:

10 gr. of the product, prepared from indigo according to the U. S. A. Letters Patent No. 1,448,251, dissolved in
490 gr. of water, poured in
500 gr. of neutral tragacanth thickening, made up to 1000 gr.

The goods are dried and printed once more with:

13 gr. of ortho-chloroanilin are dissolved with
30 gr. of hot water and
30 cc. of hydrochloric acid 20° Bé.
140 gr. of cold water,
150 gr. of ice and after cooling down
7,5 gr. of sodium nitrite and
30 gr. of water are added; the diazotation being complete the mass is poured in
450 gr. of neutral tragacanth thickening,
50 cc. of sodium acetate 1:1 are added and the whole is made up to 1000 gr.

The goods are dried, passed in the mentioned developing-bath, rinsed, soaped, rinsed and dried.

Blue, green and yellow printing-effects on a white ground are obtained.

EXAMPLE 6.

The cotton goods are prepared with the following padding-solution and dried: 8 gr. of meta-nitroanilid of 2.3-oxynaphthoic acid, 10 cc. of caustic soda solution of 34° Bé., 8 gr. of Turkey red oil in 1 liter.

The goods are then printed with the following printing-color:

10 gr. of meta-nitro-ortho-anisidin ($OCH_3 : NH_2 : NO_2 = 1 : 2 : 4$) are dissolved with
15 gr. of hydrochloric acid of 22° Bé. and
100 gr. of boiling water and
160 gr. of ice are added. After cooling down while stirring
25 cc. of sodium nitrate 1:4 are added. The diazotation being complete, the mass is poured in
500 gr. of neutral tragacanth thickening, neutralized with
25 gr. of sodium acetate and
20 gr. of the product, prepared from indigio, according to the U. S. A. Letters Patent No. 1,448,251, dissolved in
145 gr. of water, are added and the whole is made up to 1000 gr.

The goods are dried, steamed for a short while and passed into the mentioned developing-bath, rinsed, soaped and dried.

A dark violet of an excellent fastness is obtained.

EXAMPLE 7.

The cotton goods are prepared with the following solution and dried.

*Padding-solution 1.*

10 gr. of diacetoacetyl-ortho-tolidin, 12 cc. of caustic soda solution of 34° Bé., 10 gr. of Turkey red oil in 1 liter.

The goods are then padded with the following solution:

*Padding-solution 2*

50 gr. of the diazo-salt of 2.5-dichloroanilin are dissolved in
300 gr. of water and
400 gr. of neutral tragacanth thickening,
10 gr. of the product, prepared from indigo according to the U. S. A. Letters Patent No. 1,448,251, dissolved in
240 gr. of water, are added and the whole is made up to 1000 gr.

The goods are dried, steamed for a short while and passed into the mentioned developing-bath, rinsed, soaped, rinsed and dried.

A light green shade of an excellent fastness is obtained.

EXAMPLE 8.

The unprepared goods are printed with the following printing-color and dried:

*Printing-color 1.*

10 gr. of meta-nitroanilid of 2.3-oxynaphthoic acid,
12 cc. of caustic soda solution of 34° Bé.,
10 gr. of Turkey red oil are dissolved in
200 gr. of boiling water and poured in
500 gr. of neutral tragacanth thickening. After cooling down
10 gr. of the product, prepared from indigo according to the U. S. A. Letters Patent No. 1,448,251, dissolved in
258 gr. of water, are added and the whole is made up to 1000 gr.

The goods are printed once more with a second printing-color or padded with a corresponding solution.

*Printing-color 2.*

50 gr. of the diazo-salt of 2.5-dichloroanilin are dissolved in
450 gr. of water and poured in
500 gr. of a neutral tragacanth thickening and the whole is made up to 1000 gr.

The goods are dried and passed into a lukewarm to boiling bath, containing 3 gr. of iron chloride, 1 gr. of bichromate, 25 gr. of sodium bisulfate. 1 liter, rinsed, soaped and dried.

A reddish brown of an excellent fastness is obtained.

EXAMPLE 9.

The unprepared goods are printed with the following printing-color:

*Printing-color 1.*

10 gr. of diacetoacetyl-ortho-tolidin,
12 cc. of caustic soda solution of 34° Bé.,
10 gr. of Turkey red oil are dissolved in
200 gr. of boiling water and poured in
500 gr. of neutral tragacanth thickening. After cooling down
10 gr. of the product, prepared from indigo according to the U. S. A. Letters Patent No. 1,448,251, dissolved in
258 gr. of water, are added and the whole is made to 1000 gr.

The goods are printed with a second printing-color or padded with a corresponding solution.

*Printing-color 2.*

10 gr. of metra-nitro-ortho-anisidin $(OCH_3:NH_2:NO_2=1:2:4)$ are dissolved with 15 gr. of hydrochloric acid of 22° Bé. and
100 gr. of boiling water,
165 gr. of cold water,
160 gr. of ice are added, after cooling down
25 cc. of sodium nitrite 1:4, poured in
500 gr. of neutral tragacanth thickening, and
25 gr. of sodium acetate are added and the whole is made up to 1000 gr.

The goods are dried and passed into the bath mentioned in example 8, rinsed, soaped and dried.

A green of an excellent fastness is obtained.

By varying the proportions of mixtures and the components thereof numerous further shades can be obtained.

In the same manner, as the ester-salt of the leuco derivative of indigo, the corresponding derivatives of the halogenated indigos, thioindigo and other vat dyestuffs can be used. As suitable oxidizing agents we may mention: hydrogenperoxide, perborates, persulfates or chlorates, chromates and so on.

An appropriate oxidizing agent may also be added to the printing-colors. Then as developing-baths only accordingly diluted acids or solutions of salts, acting as acids, may be used.

Now what we claim and desire to secure by Letters Patent is the following:

1. A process of producing combined shades of azodyestuffs and vat dyestuffs on the vegetable fiber consisting in impregnating the fiber with an alkaline solution of an azo-component, developing with a diazo-solution, an ester-salt of the leucocompound of a vat dyestuff being added to one of said solutions and in treating the fiber with oxidizing agents in an acid medium.

2. Materials dyed with an azodyestuff and a vat dyestuff according to claim 1, said dyestuffs being developed on the fiber of the material.

GUSTAV PETZOLD.
HEINRICH RITTNER.